BOLTON & SECOR.
Feeding Device for Sewing Machines.
No. 49,967.
Patented Sept. 19, 1865.
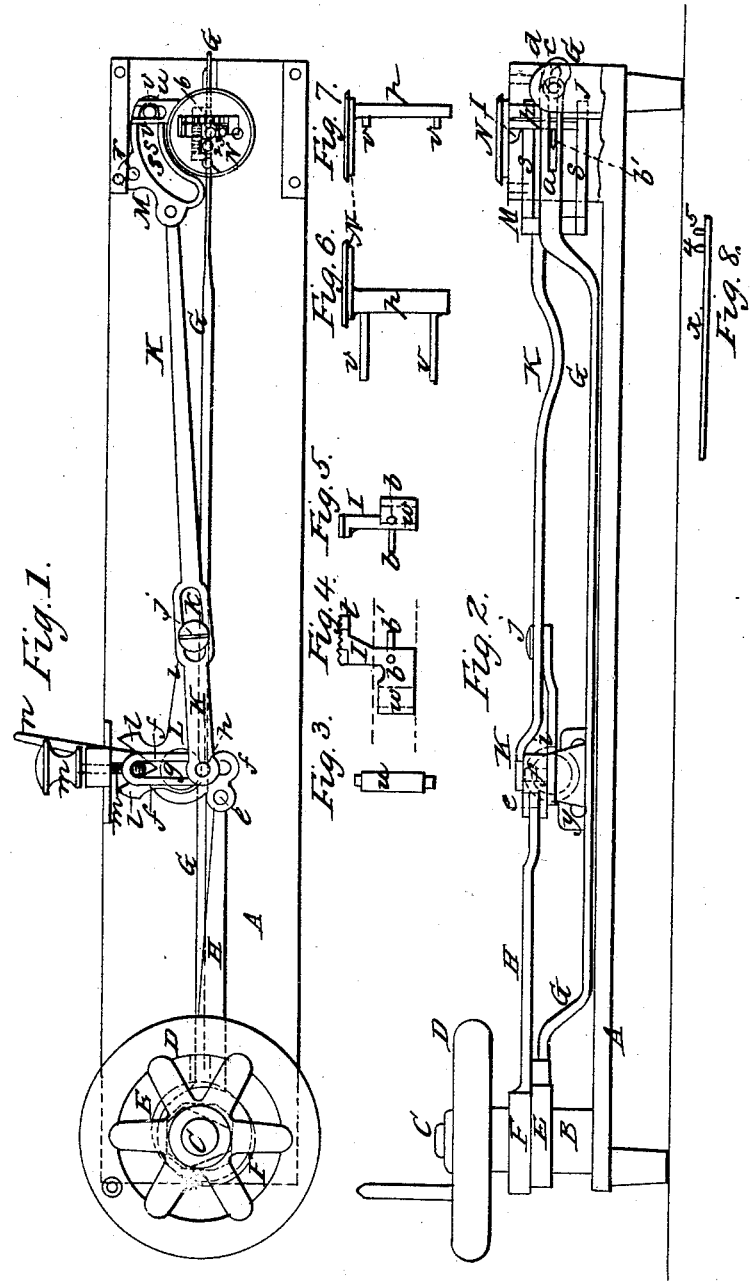

UNITED STATES PATENT OFFICE.

JAMES BOLTON AND JEROME B. SECOR, OF CHICAGO, ILLINOIS.

IMPROVEMENT IN FEEDING DEVICES FOR SEWING-MACHINES.

Specification forming part of Letters Patent No. 49,967, dated September 19, 1865.

*To all whom it may concern:*

Be it known that we, JAMES BOLTON and JEROME B. SECOR, of Chicago, in the county of Cook and State of Illinois, have invented a new and useful Improvement in the Feeding Mechanisms of Sewing-Machines; and we do hereby declare the following to be a full, clear, and exact description thereof, reference being had to the accompanying drawings, making a part of this specification, in which—

Figure 1 represents a top plan with the top plate or table removed. Fig. 2 represents a side elevation; and Figs. 3, 4, 5, 6, 7, and 8 represent detached portions thereof.

Similar letters of reference, where they occur in the separate figures, denote like parts of the apparatus in all the drawings.

Our invention consists in a turning or revolving feed-guide and feeding-dog, by which the material being sewed may be fed in any desired direction or at any desired angle within certain limits; and it further consists in so constructing the feeding-surface of the foot or dog as that the material being sewed shall be clamped on the finished seam in sewing in either direction.

To enable others skilled in the art to make and use our invention, we will proceed to describe the same with reference to the drawings, premising that the feeding mechanism may be attached to or worked in connection with any of the sewing-machines of the present day.

On a suitable support, A, is a hollow upright, B, in which a shaft, C, that may be turned by a crank-wheel, D, or any other equivalent mechanism, is supported, so as to freely turn therein. Upon this shaft C there are arranged at suitable angles to each other two angular-shaped cams, one of which is shown in red in Fig. 1, and both being alike, the corners of said angular-shaped cams being rounded off, so that they will freely turn and work in rectangular-shaped openings with rounded corners (as also shown in red in Fig. 1) in the hubs E F of the connecting-rods G H, respectively, by which said rods receive their timed movements and communicate them, as will be hereinafter described, to the feeding mechanism arranged at the opposite end of the base or support A. The form of the rod G is seen in Fig. 2, and extends uninterruptedly to the feeding mechanism, and has in it, near its extreme end, a horizontal slot, $a$, in which one or the other of the pins $b \; b'$ on the feeding foot or dog I, as the case may be, works, and by which pin said foot or dog is raised up and let down to seize and let go of the cloth or other material being sewed, while the forward-and-backward movement of said dog is accomplished through the movement of the other connecting-rod, H, and its several connected and operating parts, as will be explained.

At the extreme end of the rod G there is a downwardly-curving slot, $c$, which works upon a fixed stud, $d$, in the upright piece J. This curved slot $c$ gives to that end of the rod G a rising-and-falling motion, while its backward-and-forward reciprocating motion is given to it by the cam at its other end, as above mentioned.

The rod H is pivoted at $e$ to a link, $f$, that has a curved slot, $g$, in it, in which slot a stud or pin, $h$, in the end of a second connecting-rod, K, can move. Underneath the link $f$ there is pivoted a bell-crank lever, L, the long arm $i$ of which is pivoted to the connecting-rod K by a pin, $j$, that passes through a slot, $k$, in said rod and then into said arm $i$. The other or short arm, $l$, of the bell-crank lever L is bifurcated, and a set-screw, $m$, passes into the angular space between its branched ends, to define the extent of the movement of said lever L and adjust it at pleasure by moving said screw in or out, as the case may be.

A handle, $n$, projects from the bell-crank L to admit of its easy movement. The link $f$ is pivoted at its center, and when the stud $h$ is over that pivot of course the rod K has little or no motion; but the farther the pin $h$ is moved either way from that center the more motion will the rod have, and of course the greater will be the throw of the feeding-dog; and the changing of the pin $h$ from one side of the center or pivoted point of the link to the other side also changes the motion of said feeding-dog—indeed reversing its motions.

The connecting-rod K is pivoted at $o$ to what we term "the feed-mechanism carrier" M, and this carrier M is, in turn, pivoted to the bed-frame or table at $r$, so that it may be turned or receive an oscillating motion from the motion of the connecting-rod K. This carrier M has upon it two slotted curved arcs, $s$, one at its upper and the other at its lower side, (one only being distinctly seen, but both alike,) in which a stud or post, $u$, connected with the turning feed-guide N, can move; and the feed-guide has an elongated slot cut through it, through which slot the toothed or roughened feeding dog or foot $t$ projects, so that when the feed-guide N is turned the feeding-dog I and its feeding-surface $t$ must turn with it, and this turning is to the extent of ninety degrees, or a right angle, so that the material to be sewed may be fed in the line of the motion of the rods G H, or in a line at right angles thereto, or in any intermediate line within the quadrant movement, and from left to right or right to left, as the pin or stud $h$ may be placed to one side or the other of the center of motion of the link $f$.

On the under side of the feed-guide there is fastened a stem, $p$, which projects downward, and has upon it two forked arms, $v\ v$, which take over the journals respectively on the top and bottom of the stud or post $u$, so that as the feed-guide N is turned the stem $p$ is turned, and in turning it carries, by means of its arms $v\ v$, the stud or post $u$ around in the curved slots $s$ of the feed-carrier, so that whatever motion said carrier receives from its rod K it imparts to the feed mechanism, whether said mechanism be in one end of its slotted arcs or in the opposite ends thereof.

The feed-dog I has a hub, $w$, upon it, which is bored out so as to fit over the stud or post $u$, and the post $u$ is long enough to allow the dog to rise and fall upon it as it performs two of its essential feed motions; and this hub has also a turning or pivoted motion on the stud $u$. The pins $b\ b'$ on the feed-dog I are set at right angles to each other, so that in turning the dog a quarter of a circle one pin shall move out of and the other into the slot $a$ in the rod G.

The feed guide and dog may be turned by a lever, $x$, Fig. 8, the studs 4 5 of which may take into corresponding holes 1 2 in the feed-guide for this purpose. The needle-hole 3 through the feed-guide occupies a central position with regard to the feeding roughened surface $t$, it being made through a tongue, 6, that projects into a recess in the feeding-foot. By this means, whether the feed be as shown by the foot in black lines or at right angles thereto, as shown by red lines, and either to the right or left of those lines, the clamping of the material will always be upon the finished seam, which is the strongest part of the goods, and most fit to sustain the feed motion without stretching.

There may be a hollow post underneath or below the needle-hole 3 to protect the needle when it is down.

$y$ is a guide-plate for the lever $n$ to work in.

Having thus fully described our invention, what we claim is—

1. The combination of the turning feeding foot or dog and the turning feed-guide, for the purpose of changing the direction of the feed of the material to be sewed from one line to another at right angles therewith, substantially as described.

2. In combination with a turning feeding foot or dog, the studs or arms $b\ b'$, arranged at right angles to each other, so that, whether the feeding be longitudinally or laterally of the machine, the said foot shall be in working position with the rod G, that gives it part of its feeding movement, substantially as described.

3. In combination with a turning feeding foot or dog, the pivoted, slotted, and oscillating carrier M, for giving said foot or dog a part of its feed movement in any of its positions, substantially as described.

4. In combination with a turning feed and the oscillating carrier, the stud or post $u$, for guiding and directing the feeding-foot and allowing it to rise and fall thereon, substantially as described.

5. The pivoted and adjustable link L, interposed between the rods G K, for the purpose of regulating the extent as well as the time of the motion of the carrier M, substantially as described.

JAMES BOLTON.
JEROME B. SECOR.

Witnesses:
H. E. SCOTCHMER,
W. B. MAYDWELL.